Feb. 2, 1926.

W. E. MENZIES

ELECTRICAL SYSTEM

Filed April 27, 1922

1,571,908

WITNESSES:

P. J. Fitzgerald
J. R. Langley

INVENTOR
William E. Menzies.
BY
Charles G. Carr
ATTORNEY

Patented Feb. 2, 1926.

1,571,908

UNITED STATES PATENT OFFICE.

WILLIAM E. MENZIES, OF IRWIN, PENNSYLVANIA, ASSIGNOR TO WESTINGHOUSE ELECTRIC & MANUFACTURING COMPANY, A CORPORATION OF PENNSYLVANIA.

ELECTRICAL SYSTEM.

Application filed April 27, 1922. Serial No. 556,822.

*To all whom it may concern:*

Be it known that I, WILLIAM E. MENZIES, a citizen of the United States, and a resident of Irwin, in the county of Westmoreland and State of Pennsylvania, have invented a new and useful Improvement in Electrical Systems, of which the following is a specification.

My invention relates to electrical systems and it has particular relation to electrical systems of the single-unit type which embody dynamo-electric machines that operate either as motors or as generators.

One object of my invention is to provide an arrangement whereby the load circuit of a dynamo-elecric machine may be controlled in accordance with the conditions under which the machine is operating.

A second object of my invention is to provide a cutout for controlling the main circuit of a dynamo-electric machine in such manner as to be substantially independent of the speed at which the machine is operated.

A further object of my invention is to provide a cutout for an electrical system which operates in accordance with the position of the magnetic field of the dynamo-electric machine operating as a generator, as determined by the armature reaction thereof.

It is well known that, as the load of an electric generator increases, the armature reaction increases and causes the magnetic field of the generator field to shift in the direction of rotation of the armature. The effect produced by the armature reaction is the more marked when the dynamo-electric machine changes its operation from that of a motor to that of a generator because the distortion is in opposite directions under the respective conditions.

The voltage between the main or working brushes of the dynamo-electric machine is not changed by the shifting of the magnetic field because the brushes are symmetrically placed relatively to the field-magnet poles. This is not the case, however, with the voltage between other points on the commutator cylinder and the brushes. The field distortion operates to decrease the voltage between a given point intermediate the brushes and the leading brush and to correspondingly increase the voltage between that point and the trailing brush of opposite polarity.

This unequal effect produced by the shifting of the magnetic field is utilized in the present invention to provide means for automatically controlling the load circuit of the dynamo-electric machine when operating as a generator in accordance with conditions obtaining in the magnetic circuits of the dynamo-electric machine, as measured by voltage values between selected points. A cutout is provided with a single shunt actuating coil that is connected between one of the main brushes and an auxiliary brush that is displaced from the main brush to which it is connected by approximately ninety electrical degrees opposite to the direction of rotation of the armature.

When the machine operates as a motor, the field is distorted in such direction as to cause a diminished voltage between the auxiliary or third brush and the main brush across which the shunt actuating coil is connected. When the dynamo-electric machine operates as a generator, the field distortion causes an increased voltage between these brushes and the cutout may operate to close the circuit controlled thereby at substantially the same speed as when operating as a motor.

In the accompanying drawing.

Figure 1:
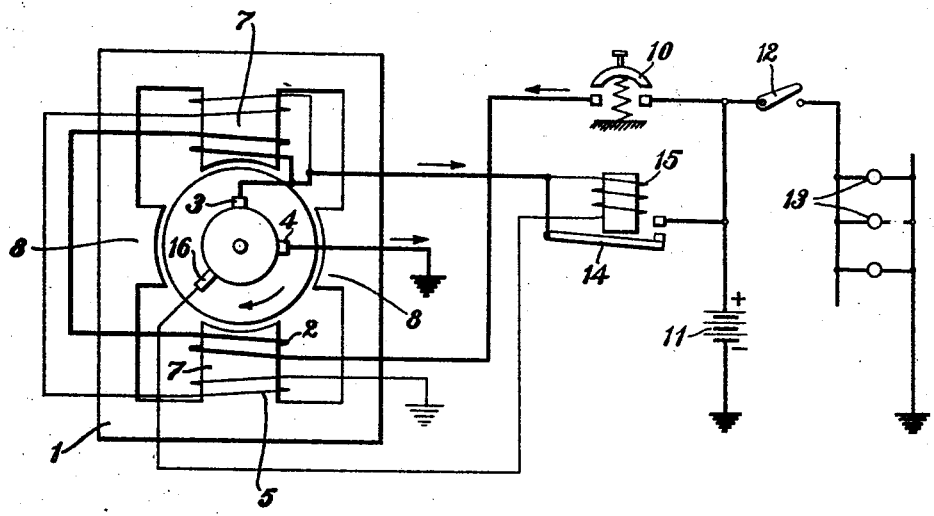
Figure 1 is a diagrammatic view of circuits and apparatus embodying my invention.

Referring particularly to Fig. 1, a dynamo-electric machine 1 is provided with a series field-magnet winding 2 that is connected in series with the main or working brushes 3 and 4. A shunt field-magnet winding 5, which is coaxial with the series field-magnet winding 2, is connected between the same brushes. The windings 2 and 5 surround core members 7 and are so arranged relatively thereto that they produce poles of like polarity. The dynamo-electric machine is also provided with polar projections 8 to form consequent poles when the core members 7 are magnetized.

The main circuit of the dynamo-electric machine comprises the series field-magnet winding 2, a starting switch 10, a storage batery 11, a switch 12 and lamps 13 which may be, for example, the lamps of an automobile. A branch circuit that is in parallel relation to the starting switch 10 is controlled by a cutout 14. The cutout 14 is provided with a single shunt actuating coil 15 that is connected to the main brush 3 and to an auxiliary or third brush 16.

It may be assumed that the dynamo-electric machine is operatively connected to the gas engine of an automobile or other suitable prime mover. To start the engine, the switch 10 is actuated to its closed position to complete a circuit which extends from the battery 11 through switch 10, series field-magnet winding 2, main brush 3 through the armature and main brush 4 to ground, the opposite terminal of the battery 11 being also grounded. The dynamo-electric machine operates as a series motor to start the engine. During the operation of the machine as a motor, the field is distorted by the armature reaction until it assumes a shape approximately that represented by the curve A in Fig. 2.

Figure 2:
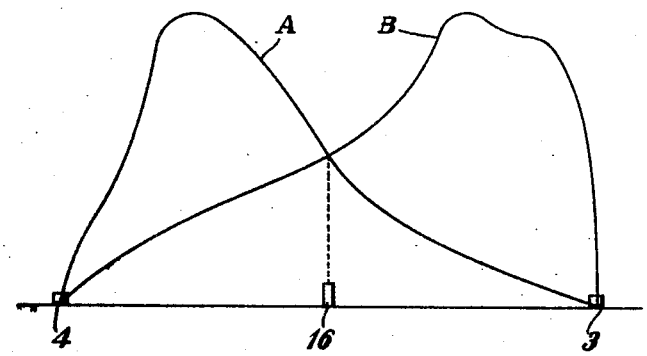
Fig. 2 is a diagrammatic view of curves representing the distribution of field flux of the dynamo-electric machine during motor operation and generator operation, respectively.

It will be noted, upon reference to Fig. 2, that, when the field flux is distributed as indicated by curve A, the voltage is relatively high between main brush 4 and auxiliary brush 16 and is relatively low between auxiliary brush 16 and main brush 3.

When the engine starts under its own power and the dynamo-electric machine is driven by the engine as a generator, the armature reaction causes the field to be distorted in the manner shown in curve B of Fig. 2. Under this condition, voltage is relatively high between main brush 3 and auxiliary brush 16 across which the shunt actuating coil of the cutout is connected. Accordingly, the cutout 14 operates to complete a circuit which is in parallel relation to the starting switch 10 and which constitutes the charging circuit of the machine when actuating as a generator.

The cutout remains in its closed position so long as the voltage between the auxiliary brush 16 and the main brush 3 exceeds the value for which it is calibrated. The cutout opens when the voltage of the machine decreases below the predetermined value by reason of materially diminished speed of the latter and the armature reaction is insufficient to maintain the required voltage between the auxiliary brush 16 and the main brush 3.

By means of the arrangement described above, I provide a cutout which operates substantially in accordance with electrical conditions obtaining in the generator circuits and substantially independently of the speed of the generator. During the change from motor operation to generator operation, with approximately no change in speed, the voltage between the auxiliary brush and the main brush across which the shunt coil is connected may be increased approximately 300%. In other words, the cutout operates substantially according as a dynamo-electric machine operates as a motor or as a generator.

I claim as my invention:

1. An electrical system comprising a dynamo-electric machine having main and auxiliary brushes, a load circuit for said machine, and a cutout for controlling said load circuit, said cutout having a single coil connected across a main brush and an auxiliary brush of said machine.

2. An electrical system comprising a dynamo-electric machine having main and auxiliary brushes, a load circuit for said machine, and a cutout for controlling said load circuit, said cutout having a single coil energized in accordance with the value of the voltage across a main brush and an auxiliary brush of said machine.

3. An electrical system comprising a dynamo-electric machine having main and auxiliary brushes, a load circuit for said machine, and a cutout for controlling said load circuit, said cutout having a shunt coil connected across an auxiliary brush and a main brush between which the value of the voltage is higher during the operation of the machine as a generator than as a motor.

4. An electrical system comprising a dynamo-electric machine having main and auxiliary brushes, a load circuit for said machine, and a cutout for controlling said load circuit, said cutout having a single coil connected across a main brush and an auxiliary brush between which the value of the voltage is higher during the operation of the machine as a generator than as a motor.

5. An electrical system comprising a dynamo-electric machine having main and auxiliary brushes, a load circuit for said machine, and a cutout for controlling said load circuit, said cutout having a single shunt actuating coil that is connected across an auxiliary brush and that main brush between which the value of the voltage increases when the machine changes its operation from that of a motor to that of a generator.

In testimony whereof, I have hereunto subscribed my name this 18th day of April, 1922.

WILLIAM E. MENZIES.